(12) United States Patent
Bornstein et al.

(10) Patent No.: US 9,858,052 B2
(45) Date of Patent: Jan. 2, 2018

(54) DECENTRALIZED OPERATING SYSTEM

(71) Applicant: Razer (Asia-Pacific) Pte. Ltd., Singapore (SG)

(72) Inventors: Daniel R. Bornstein, San Francisco, CA (US); Tom Moss, Los Altos, CA (US); Michael A. Chan, San Francisco, CA (US); Linda Tong, San Francisco, CA (US); Justin Quan, San Francisco, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 752 days.

(21) Appl. No.: 14/179,778

(22) Filed: Feb. 13, 2014

(65) Prior Publication Data

US 2014/0289411 A1 Sep. 25, 2014

Related U.S. Application Data

(60) Provisional application No. 61/804,134, filed on Mar. 21, 2013.

(51) Int. Cl.
*G06F 9/45* (2006.01)
*G06F 9/54* (2006.01)
(Continued)

(52) U.S. Cl.
CPC .............. *G06F 8/44* (2013.01); *G06F 9/54* (2013.01); *G06F 11/1464* (2013.01); *G06F 17/3053* (2013.01); *G06F 17/30174* (2013.01); *G06F 17/30194* (2013.01); *G06F 17/30575* (2013.01); *H04L 41/0816* (2013.01); *H04L 47/70* (2013.01); *H04L 47/78* (2013.01); *H04L 63/0853* (2013.01); *H04L 67/06* (2013.01); *H04L 67/10* (2013.01); *H04L 67/1095* (2013.01); *H04L 69/04* (2013.01); *H04W 12/06* (2013.01); *G06F 11/1451* (2013.01); *G06F 11/1469* (2013.01)

(58) Field of Classification Search
CPC ... G06F 8/44; G06F 9/54; G06F 9/546; H04L 41/70; H04L 41/0816
USPC .................................................. 709/201, 226
See application file for complete search history.

(56) References Cited

U.S. PATENT DOCUMENTS 6,167,430 A * 12/2000 Lurndal .................. G06F 9/544
709/203
8,510,759 B1 * 8/2013 Mcgowan ............... G06F 12/10
709/231

(Continued)

OTHER PUBLICATIONS

U.S. Appl. No. 14/221,161 by Chan, M.A. et al., filed Mar. 21, 2014.

(Continued)

*Primary Examiner* — David Lazaro
*Assistant Examiner* — Zi Ye
(74) *Attorney, Agent, or Firm* — Mattingly & Malur, PC (57) ABSTRACT

Technology is disclosed for enabling multiple computing devices used by a user to interoperate with one another. The technology enables the user to install a given application on a distributed operating system ("DCOS") managing the multiple computing devices as a single entity. The user can then use the given application through any of the computing devices when executing the given application through the DCOS.

22 Claims, 7 Drawing Sheets

(51) Int. Cl.
*H04L 12/24* (2006.01)
*G06F 15/173* (2006.01)
*G06F 17/30* (2006.01)
*H04L 29/08* (2006.01)
*G06F 11/14* (2006.01)
*H04L 12/911* (2013.01)
*H04L 29/06* (2006.01)
*H04W 12/06* (2009.01)

(56) References Cited

U.S. PATENT DOCUMENTS

| | | | |
|---|---|---|---|
| 8,607,086 B2 | 12/2013 | Cullimore | |
| 9,345,965 B2 * | 5/2016 | Knutsson | A63F 13/12 |
| 2004/0268340 A1 * | 12/2004 | Steeb | G06F 8/60 |
| | | | 717/174 |
| 2005/0125486 A1 * | 6/2005 | Chrysanthakopoulos | |
| | | | G06F 9/546 |
| | | | 709/201 |
| 2005/0256923 A1 * | 11/2005 | Adachi | G06F 17/30905 |
| | | | 709/203 |
| 2006/0200702 A1 * | 9/2006 | Canning | G06F 11/0715 |
| | | | 714/38.1 |
| 2008/0147781 A1 * | 6/2008 | Hopmann | G06F 17/30578 |
| | | | 709/203 |
| 2013/0061070 A1 | 3/2013 | Cullimore | |

OTHER PUBLICATIONS

U.S. Appl. No. 14/221,095 by Chan, M.A. et al., filed Mar. 20, 2014.

\* cited by examiner

DECENTRALIZED OPERATING SYSTEM

CROSS-REFERENCES

This application claims the benefit of U.S. provisional application No. 61/804,134, filed Mar. 21, 2013, which is hereby incorporated by reference in its entirety.

TECHNICAL FIELD

An example embodiment of the present invention relates generally to multiple connected devices and, more particularly, to the management of tasks across multiple devices.

BACKGROUND

A person today uses a number of computing devices to perform various tasks during the course of their day. For instance, a person/user may use a laptop for work, a tablet for entertainment, a smartphone for phone calls, etc. Further, given the convergence of capabilities amongst the various computing devices, the user may use any of the computing devices to perform many of their tasks. However, once a user begins a task in one computing device, there is very limited ability to continue the task in another computing device without an inordinate amount of manual effort. The computing devices do not automatically synchronize with each other to facilitate such a migration of task amongst computing devices without manual intervention.

For example, a user might begin playing a video game Angry Birds® in their smartphone while on their way back home from work. Once home, the user might prefer to continue playing the game in their tablet. To do so, the user must first install the video game Angry Birds® in both their smartphone and their tablet. Next, the user might have to manually save the current playing state in a remote server and use the saved playing state to manually resume playing the game at the tablet (if such a feature is available for the game). There is, however, no means for the user to simply stop using the smartphone and pick up the tablet and resume playing the game in the tablet. These computing devices simply do not automatically synchronize with each other to allow the user to interoperate them without requiring any manual effort.

Further, the problem of interoperability amongst devices worsens as the user adds more devices that the user uses to perform her various tasks. Each new device might have a completely different capability, making even manual effort to synchronize and use these various devices a challenge. For one, the user might have to manually determine which of the devices have sufficient resources to support an application and install the application in each of those devices. This leads to a fragmentation of capabilities among the various devices, where one subset of devices can run one application while another subset of devices can run another application. Such fragmentation can cause confusion and inconvenience to the user as the user will have to remember the various fragmentations when wanting to interoperate amongst the devices.

Accordingly, the known techniques for enabling multiple computing devices used by a person to interoperate with one another are limited in their capabilities and suffers from at least the above constraints and deficiencies.

SUMMARY

Technology is disclosed for enabling multiple computing devices used by a user to interoperate with one another ("the technology"). The technology enables the user to install a given application on a decentralized operating system ("DCOS") that manages the multiple computing devices as a single entity. The given application can then be used through any of the computing devices when executing the given application through the DCOS.

For instance, the technology enables the use of the user interface of any of plurality of computing devices to interact with the DCOS, e.g., through a home screen/desktop of the DCOS, and to install an application on the DCOS. The application is installed on an application layer of the DCOS, where any of the computing devices being managed by the DCOS can invoke the application installed on the application layer of the DCOS. Thus, a separate installation of the application on each of the computing devices is not required to execute the application through any of the computing devices if the application is installed through the DCOS managing the computing devices.

In the disclosed technology, an instance of the DCOS executes using the hardware resources of the multiple computing devices and manages the hardware resources of all the computing devices as a single entity. The various components of the DCOS, e.g., file system of the DCOS, is stored across the hardware resources of the multiple computing devices. For instance, the data associated with a file system of the DCOS is stored across the memory resources of the various computing devices. The DCOS gathers any required data associated with the file system from across the computing devices when needing to provide access the file system.

Similarly, the execution of an instance of the DCOS is performed using the hardware resources that are available across the computing devices. For instance, when a thread associated with the executing instance of this DCOS wants to execute a function, a kernel of the DCOS translates the function into data processing instructions and coordinates the various local OS kernels managing the hardware resources, e.g., CPU, memory, etc., of each of the computing devices to execute the instructions.

Technology is further disclosed that allows a subset of the multiple computing devices to be operable running the DCOS when any of the devices of the multiple computing devices is non-responsive due to, for example, dead battery, offline mode execution, etc. In the disclosed technology, the DCOS uses a data replication strategy to replicate the data required for the DCOS and the various applications across a subset of the computing devices. The data replication strategy can be dynamically fine-tuned based on an observed data access pattern. In the disclosed technology, the data are replicated such that a copy of required data is likely to be available for a possible combination of subsets of the multiple computing devices.

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Figure 1:
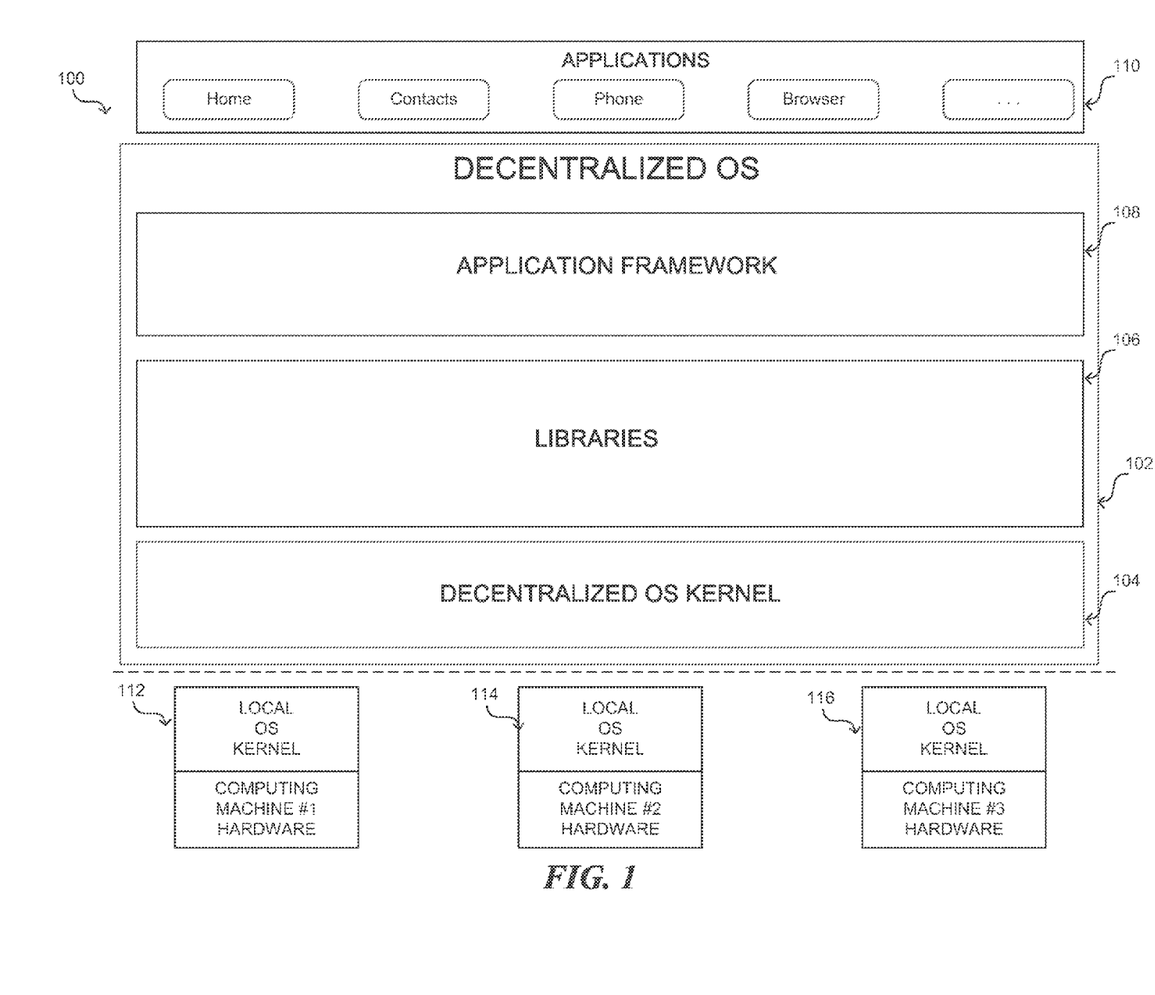
FIG. 1 is a block diagram illustrating an exemplary environment of interoperable computing devices in which the technology can operate in various embodiments.

Several embodiments of the disclosed technology are described in more detail in reference to the Figures. Turning now to Figures, FIG. 1 is a block diagram illustrating an exemplary environment 100 of interoperable computing devices in which the technology can operate in various embodiments. It should be noted that the described technology can be implemented in other processing environments and the technology's operation should not be considered limited to the enabling interoperable computing devices.

The environment 100 includes multiple computing devices 112, 114, 116 that are managed as a single entity by an instance of a DCOS 102 that executes using the hardware resources 112b, 114b, 116b of the computing devices 112-116. In the environment 100, the DCOS 102 is interposed between the executing applications and the physical hardware resources 112b-116b of the various computing devices 112-16 to manage/execute the physical hardware resources 112b-116b on behalf of the executing applications. The DCOS 102 includes a DCOS kernel 104 that allows the OS 102 to manage the hardware resources 112b-116b of the various computing devices 112-16 as a single entity.

The computing devices 112-16 can be a desktop computer, a laptop computer, a tablet computer, a game console, a smart phone, a personal digital assistant, or other electronic devices capable of running computer applications, as contemplated by a person having ordinary skill in the art. The hardware resources 112b-116b of the various computing devices 112-116 can include central processing units ("CPU"), storage devices, graphics processing units ("GPU"), network communication hardware, a display screen, a video camera, a microphone, etc. The storage devices can include optical disk storage, RAM, ROM, EEPROM, flash memory, phase change memory, magnetic cassettes, magnetic tapes, magnetic disk storage, or any other computer storage medium which can be used to store the desired information.

In embodiments, the DCOS 102 manages the multiple computing devices 112-116 as a single entity by networking all of the multiple computing devices 112-116 to communicate with each other. The multiple computing devices 112-116 may communicate with each other through a network, where the network may be any type of cellular, IP-based, or converged telecommunications network, including but not limited to Global System for Mobile Communications (GSM), General Packet Radio Service (GPRS), Enhanced Data GSM Environment (EDGE), Worldwide Interoperability for Microwave Access (Wi-MAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

In embodiments, the DCOS kernel 104 manages memory access for the storage modules in the various computing devices 112-116, determines which applications get access to which hardware resources, maintains a file system to manage the user/application data, and sets up or resets the operating states of CPUs (of the computing devices 112-116) for optimal operation at all times. In embodiments, the DCOS kernel 104 includes firmware and device drivers that control the computing device's 112-116 hardware resources at a basic level.

In embodiments, the DCOS kernel 104 includes application programming interfaces ("API") that interact with local OS kernels 112a-116a (e.g., a Linux kernel) that each directly manage the hardware resources of a respective computing device 112-116. In embodiments, the DCOS kernel 104 uses the local OS kernels 112a-116a to control the various hardware resources to perform the tasks/services provided by the DCOS kernel 104.

For instance, the DCOS kernel 104 maintains a file system to organize the stored data into a hierarchy of files and directories, where the data associated with the various files and directories are stored in the non-volatile memory of the various computing devices 112-116. To store the associated data, in embodiments, the DCOS kernel 104 divides the data into data blocks and determines the memory location in the various non-volatile memories of the various computing devices 112-116 at which the data blocks are to be stored.

In embodiments, the DCOS kernel 104 maintains a mapping between the various local OS kernels 112a-116a and the hardware resources that are managed by the local OS kernels 112a-116a. The DCOS kernel 104 uses the mapping to send a request to the local OS kernel 104 that manages the non-volatile memory with the memory location to store the data block in that memory location. The local OS kernel 104 uses firmware (e.g., a hard drive firmware) to control the non-volatile memory (e.g., hard drive) to store the data block in the requested memory location.

In embodiments, the DCOS 102 includes libraries 106 that enable various operating system related tasks, e.g., file manipulation, to be performed. In embodiments, the libraries 106 are written in C/C++. The libraries 106 include, for example, a library to manage the display and windowing manager, a library to support various audio and video formats and codecs including their playback and recording, a library for rendering 2D and 3D graphics, a database library to support a database engine, etc. In embodiments, the libraries 106 are stored by the DCOS 102 across the storage devices of the computing devices 112-116.

In embodiments, the DCOS 102 includes an application framework 108 that offers an array of APIs that can be re-used by developers to perform various standard functions. The applications executing on the DCOS 102 interacts directly with the application framework 108 when a standard function included within the application framework 108 is to be executed. In embodiments, the framework consists of a manager that manages the activities that govern the application life cycle, a manager that enables the applications to create customized alerts, views that are used to create layouts, including components such as grids, lists, buttons, etc., a manager to manage external resources used by the applications, a content provider to enable sharing of data between applications, etc.

In embodiments, the application framework 108 is stored by the DCOS 102 across the storage devices of the computing devices 112-116. It should be noted that the above description of the various components of the DCOS 102 are not intended to be exhaustive. The DCOS 102 can include other components that are required for the OS 102 to function or can improve the performance of the OS 102 as contemplated by a person having ordinary skill in the art. Further, the architecture of the OS 102 provided in FIG. 1 is intended as an illustrative example. Therefore, the DCOS 102 can include other architectures as contemplated by a person having ordinary skill in the art.

In embodiments, the environment 100 includes an application layer 110 consisting of the various computer applications installed on the DCOS 102 and stored using the storage devices of the computing devices 112-116. The computer applications installed on the DCOS 102 can include applications for general productivity and information retrieval, including email, calendar, contacts, and stock market and weather information. The computer applications can also include applications in other categories, such as mobile games, factory automation, GPS and location-based services, banking, order-tracking, ticket purchases or any other categories as contemplated by a person having ordinary skill in the art.

In embodiments, an instance of the DCOS 102 executes using the hardware resources 112b-116b of the multiple computing devices 112-116 and manages the hardware resources 112b-116b of all the computing devices 112-116 as a single entity. For instance, a thread associated with DCOS 102 can be executed by the DCOS 102 with the resources associated with one of the local OS kernels 112a-116a, where the thread related functions are executed by a CPU associated with the local OS kernel 112a-116a. When the thread wants to execute a function, the DCOS kernel 104 translates the function into data processing instructions and coordinates with the local OS kernel 112a-116a managing the hardware resources (e.g., CPU, memory, etc.) to execute the instructions.

In one example, the thread associated with DCOS 102 can be a thread for listening to user inputs through any of the user interfaces of the computing devices 112-116. When a user input is received through a user interface of one of the computing devices 112-116, an interrupt signal is received by the local OS kernel 112a-116a that manages the user interface. The thread associated with DCOS 102 periodically queries each of the local OS kernels 112a-116a to determine if an interrupt has been received. When an interrupt is detected, the thread informs other services of the DCOS 102 of the interrupt and a location of any data associated with the interrupt. The other services of the DCOS 102 can then perform a function associated with the received interrupt.

For example, when a user clicks on an icon of an application through display screen of a computing device 112-116, an interrupt is received by the local OS kernel of the computing device 112-116. The thread for listening to user inputs detects the interrupt the next time it polls the local OS kernel. The thread then informs other services of the DCOS 102 of the interrupt and a location of any data associated with the interrupt. The other services associate the interrupt with a user click of the icon of an application to invoke the application on the DCOS 102 and invoke the application.

The DCOS 102 can also refresh the display screen associated with the local OS kernel 112a-116a through which the interrupt is received to display content associated with the invoked application. In embodiments, the DCOS 102 also refreshes the display content to be displayed by each of the display screens associated with the other local OS kernels 112a-116a with the content associated with the invoked application. In this manner, the user associated with the computing devices 112-116 can switch between any of the devices 112-116 at any moment and be able to resume using the application in the currently used device 112-116.

In embodiments, the DCOS 102 uses a data replication strategy to replicate the data required to execute the DCOS 102 and the various applications that are installed on the DCOS 102. In some instances, the DCOS 102 that is managing a set of computing devices 112-116 and storing OS 102 and application related data across the hardware resources of the set of devices 112-116 can lose access to the hardware resources of one of the devices 112-116. In embodiments, the DCOS 102 can continue to operate and manage a subset of the computing devices 112-116 when any of the devices of the multiple computing devices is non-responsive due to, for example, dead battery, offline mode execution, etc., by replicating the data.

In embodiments, the DCOS kernel 104 manages and implements the data replication strategy. In embodiments, the DCOS kernel 104 dynamically fine-tunes the strategy based on an observed data access pattern. For example, a user uses a particular application on two particular computing devices and never in any of the other devices managed by the DCOS 102. Based on the observed access pattern, the DCOS kernel 104 will only replicate the data associated with the application in the storage devices of both the two particular devices while not replicating the data in any of the other devices as it is unlikely the application data will be needed by the user when the two particular devices are inaccessible.

In embodiments, the DCOS kernel 104 replicates the data such that a copy of required data is likely available for a predetermined combination of subsets of the computing devices. In embodiments, the DCOS kernel 104 replicates the data during storage of the data in the storage devices of the computing devices 112-116. In embodiments, the DCOS kernel 104 replicates the data based on the occurrence of predetermined events. The predetermined events could include a threshold based on the battery level of a given computing device 112-116, a threshold based on a communication delay from a given computing device 112-116, etc.

In embodiments, the DCOS kernel 104 replicates the data based on a user setting, where the setting can be set based on a scale which ranges from a conservative replication mode requiring each stored data to be replicated across each of the computing devices 112-116 to an aggressive replication mode requiring data replication under the assumption that all the computing devices 112-116 will always be accessible to each other.

In embodiments, the DCOS kernel 104 replicates the data based on an intended use of a particular computing device 112-116. For instance, if a particular computing device 112-116 needs to be operable by the user when the other devices are inaccessible, the DCOS kernel 104 replicates all the data required to run an instance of the DCOS 102 on the particular computing device 112-116 without having to access the data on the other computing devices 112-116.

Similarly, the DCOS kernel 104 replicates any data associated with applications used by the user through the particular computing device 112-116 when the other devices are inaccessible.

In some instances, a local OS kernel 112a-116a in a computing device 112-116 can be used to boot the DCOS 102 using the OS 102 associated data stored in the computing device 112-116. In embodiments, the DCOS 102 maintains a list of devices managed and identification information to establish communication with the other accessible computing devices 112-116. When another instance of the DCOS 102 is not managing the other accessible computing devices 112-116, in embodiments, the DCOS kernel 104 communicates with the local OS kernel 112a-116a of the other accessible device 112-116 to manage the hardware resources associated with the local OS kernel 112a-116a. In embodiments, the DCOS kernel 104 refreshes the content on the display screen of the local OS kernel 112a-116a of the other accessible device 112-116 to display a home screen of the DCOS 102.

When another instance of the DCOS 102 is managing the other accessible computing devices 112-116, in embodiments, the two instances of the DCOS kernels 104 communicate with each other to re-sync any modified data and any application state to be consistent across all the computing devices 112-116 managed by the DCOS 102. In embodiments, both the instances of the DCOS kernels 104 prompt the user of the computing devices 112-116 to resolve any conflict. For example, when a state of a particular instance of a video game differs between two instances of the DCOS kernels 104, the user can be prompted to choose between the which state of the game to keep and which one to discard.

When the data has been re-synced between different instances of the DCOS kernels 104, in embodiments, one of the instances of the DCOS kernel 104 assumes control of all the computing devices 112-116 while the other instances of the DCOS kernel 104 are terminated. The instance of the DCOS kernel 104 assuming control can be based on the computing devices 112-116 currently being managed by the DCOS kernel 104 before re-syncing.

Figure 2:
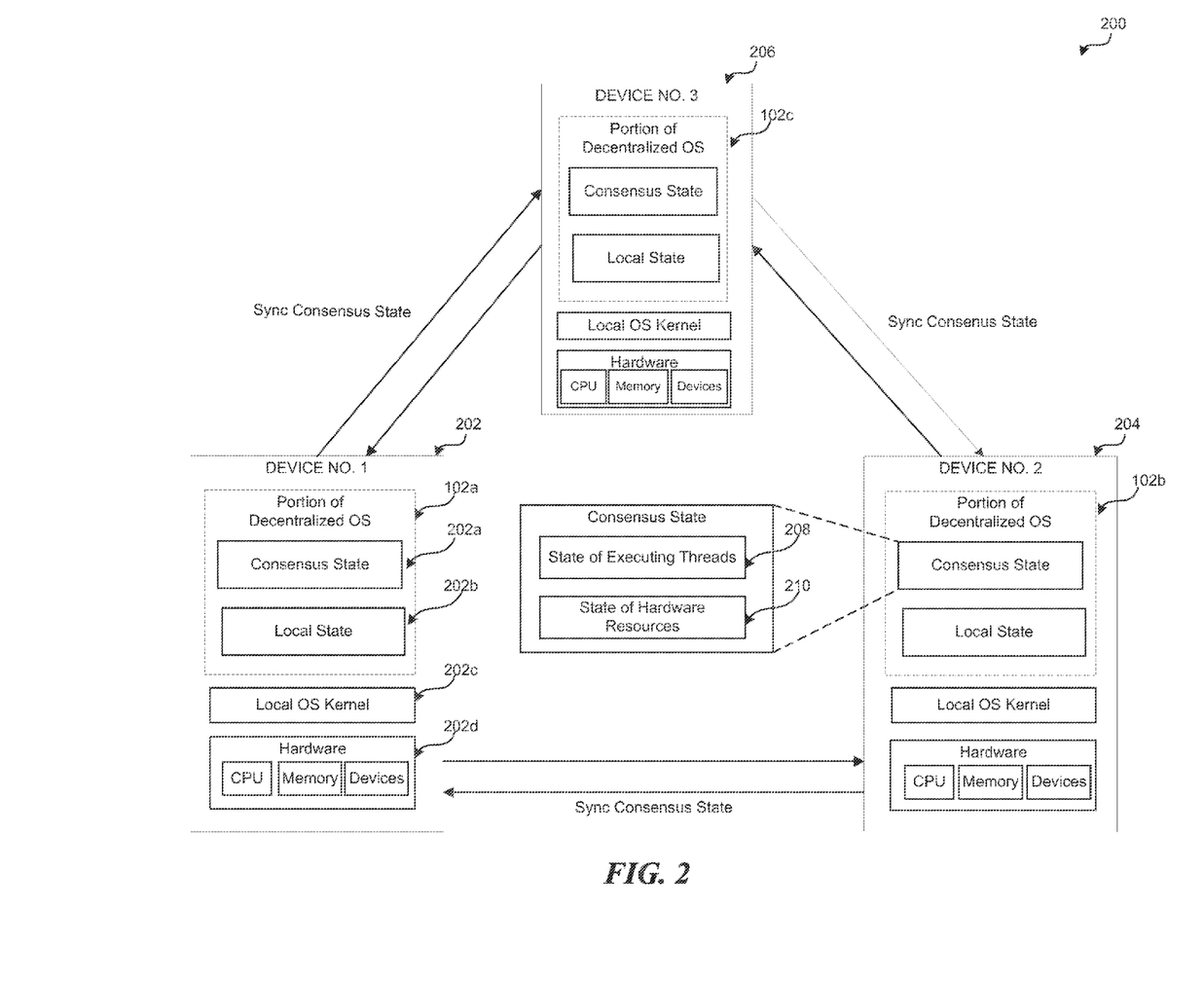
FIG. 2 is a block diagram illustrating an exemplary environment of interoperable computing devices in which the technology can operate in various embodiments.

Turning now to FIG. 2, FIG. 2 is a block diagram illustrating an exemplary environment 200 of interoperable computing devices in which the technology can operate in various embodiments. The environment 200 includes multiple computing devices 202, 204, 206 that are managed as a single entity by an instance of a DCOS 102a-102c executing using the hardware resources 202d of the computing devices 202-206. The various components of the DCOS 102a-102c (e.g., file system of the DCOS 102a-102c) are stored across the hardware resources of the multiple computing devices 202-206.

For instance, the data associated with a file system of the DCOS 102a-102c is stored across the memory resources of the various computing devices 202-206. The DCOS 102a-102c gathers any required data associated with the file system from across the computing devices 202-206 when needing to provide access the file system. Similarly, the execution of an instance of the DCOS 102a-102c is performed using the hardware resources available across the computing devices 202-206. For instance, when a thread associated with the executing instance of DCOS 102a-102c wants to execute a function, a kernel of the DCOS 102a-102c translates the function into data processing instructions and coordinates with various local OS kernels 202c managing the hardware resources 202d (e.g., CPU, memory, etc.) of each of the computing devices 202-206 to execute the instructions.

As discussed above, in embodiments, the DCOS 102a-102c can continue to operate and manage a subset of the computing devices 112-116 when any of the devices of the multiple computing devices is non-responsive due to, for example, dead battery, etc. Such an operation of the subset of computing devices 112-116 is considered an unconnected mode execution, where any change in state of the data managed by the DCOS 102a-102c is logged and maintained as a local state 202b by the DCOS 102a-102c.

In some instances, the other non-responsive computing devices 112-116 can also be executing in an unconnected mode while maintaining the changes to the data as a local state 202b. When the previously inaccessible/unresponsive computing devices 112-116 are detected by the DCOS 102a-102c managing a subset of the computing devices 112-116, in embodiments, the DCOS 102a-102c syncs up the state amongst the computing devices 112-116 using the maintained local state 202b and returns managing all the computing devices 112-116 together in a consensus state 202a.

In the consensus state 202a, the DCOS 102a-102c queries the local OS kernels 202c to provide a state of the threads 208 executing using the hardware resources 202d managed by the local OS kernels 202c and the state of the hardware resources 210 managed by the local OS kernels 202c. The gathered consensus state forms the state of execution of the DCOS 102a-102c. Additional details of re-syncing two subsets of computing devices 112-116 executing in unconnected mode and returning to managing the computing devices 112-116 in the consensus state is provided with reference to FIG. 6.

Figure 3:
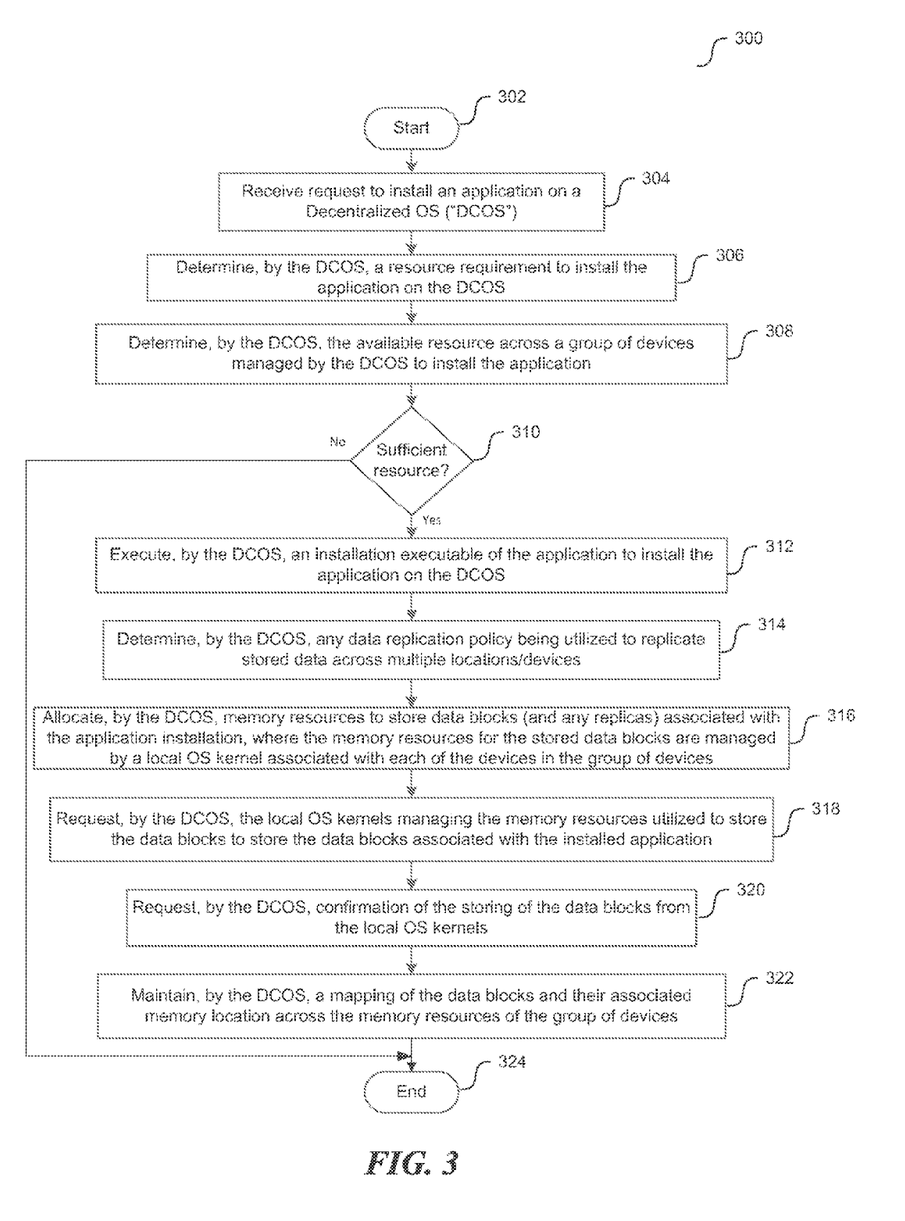
FIG. 3 is a flow diagram illustrating an application installation process implemented by the DCOS to install the application on the DCOS, consistent with various embodiments.

Turning now to FIG. 3, FIG. 3 is a flow diagram illustrating an application installation process 300 implemented by the DCOS 102 to install the application on the DCOS 102, consistent with various embodiments. The process 300 begins at block 302. At block 304, the DCOS 102 receives a request to install an application on the DCOS through a user interface of a computing device 112-116, where the device 112-116 is part of a group of devices being managed by the DCOS 102.

At block 306, the DCOS 102 determines a resource requirement to install the application on the DCOS. At block 308, the DCOS 102 determines the available resource across the group of devices managed by the DCOS to install the application. At block 310, the DCOS 102 determines if there is sufficient resource available to install the application by comparing the available resource and the determined resource required for installing the application. If there is no sufficient resource to install the application, the installation process is terminated and the user is notified of the reason. The process 300 then returns at block 324.

If there is sufficient resource to install the application, at block 312, the DCOS 102 executes an installation executable of the application to install the application on the DCOS 102. At block 314, the DCOS determines if there is a data replication policy being used to replicate stored data across multiple locations/devices. At block 316, the DCOS allocates the memory resources to store data blocks (and any replicas) associated with the installation of the application, where the memory resources for the stored data blocks are managed by a local OS kernel 112a-116a associated with each of the devices in the group of devices.

At block 318, the DCOS 102 requests the local OS kernels 112a-116a managing the memory resources being used to store the data blocks to store the data blocks associated with the installed application. At block 320, the DCOS 102 requests confirmation of the storing of the data blocks from the local OS kernels 112a-116a. At block 322, the DCOS maintains a mapping of the data blocks and their associated memory location across the memory resources of the group of devices.

The process 300 then returns at block 324. Those skilled in the art will appreciate that the logic illustrated in FIG. 3 and described above, and in each of the flow diagrams discussed below, may be altered in various ways. For example, the order of the logic may be rearranged, substeps may be performed in parallel, illustrated logic may be omitted, other logic may be included, etc.

Figure 4:
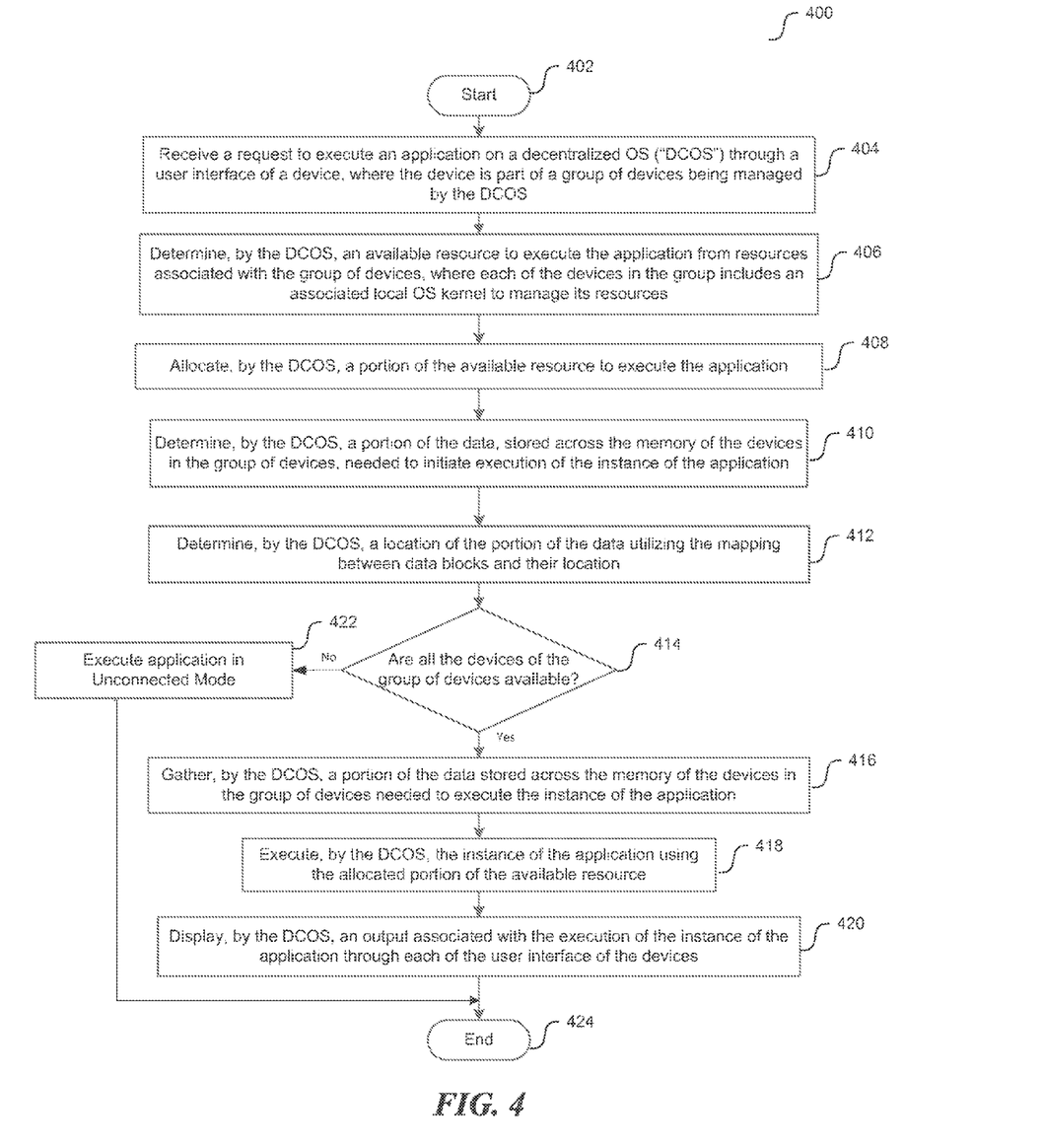
FIG. 4 is a flow diagram illustrating an application execution process implemented by the DCOS to execute the application in a connected mode on the DCOS, consistent with various embodiments.

Turning now to FIG. 4, FIG. 4 is a flow diagram illustrating an application execution process 400 implemented by the DCOS 102 to execute the application in a connected mode on the DCOS 102, consistent with various embodiments. The process 400 begins at block 402. At block 404, the DCOS 102 receives a request to execute an application on the DCOS through a user interface of a device 112-116, where the device 112-116 is part of a group of devices 112-116 being managed by the DCOS 102.

At block 406, the DCOS 102 determines an available resource to execute the application from resources associated with the group of devices, where each of the devices 112-116 in the group includes an associated local OS kernel 112a-116a to manage its resources. At block 408, the DCOS 102 allocates a portion of the available resource to execute the application, where the local OS kernel 112a-116a of devices 112-116 from the group of devices 112-116 whose resources form a part of the allocated resource are notified to allocate the resources to execute the application. At block 410, the DCOS 102 determines a portion of the data, stored across the memory of the devices 112-116 in the group of devices, needed to initiate execution of the instance of the application.

At block 412, the DCOS 102 determines a location of the portion of the data using the mapping between data blocks and their location. At block 414, the DCOS 102 determines whether all the devices 112-116 of the group of devices 112-116 are accessible. In one instance, a given device 112-116 can be considered inaccessible by the DCOS 102 if a delay associated with accessing a data stored in the given device 112-116 is over a predefined threshold. If all the devices 112-116 are not available, at block 422, the DCOS 102 initiates execution of the application in the unconnected mode. The unconnected mode is discussed in detailed with reference to FIG. 5.

If all the devices 112-116 of the group are available, at block 416, the DCOS 102 gathers a portion of the data stored across the memory of the devices 112-116 in the group of devices 112-116 needed to execute the instance of the application. At block 418, the DCOS executes the instance of the application using the allocated portion of the available resource in the selected devices 112-116 from the group of devices, where the local OS kernel 112a-116a of the selected devices 112-116 perform a function associated with the respective allocated resource.

At block 420, the DCOS displays an output associated with the execution of the instance of the application through each of the user interface of the devices, where a user associated with the devices 112-116 can access the displayed output through any of the user interfaces of the devices 112-116 at any given time. The process 400 then returns at block 424.

Figure 5:
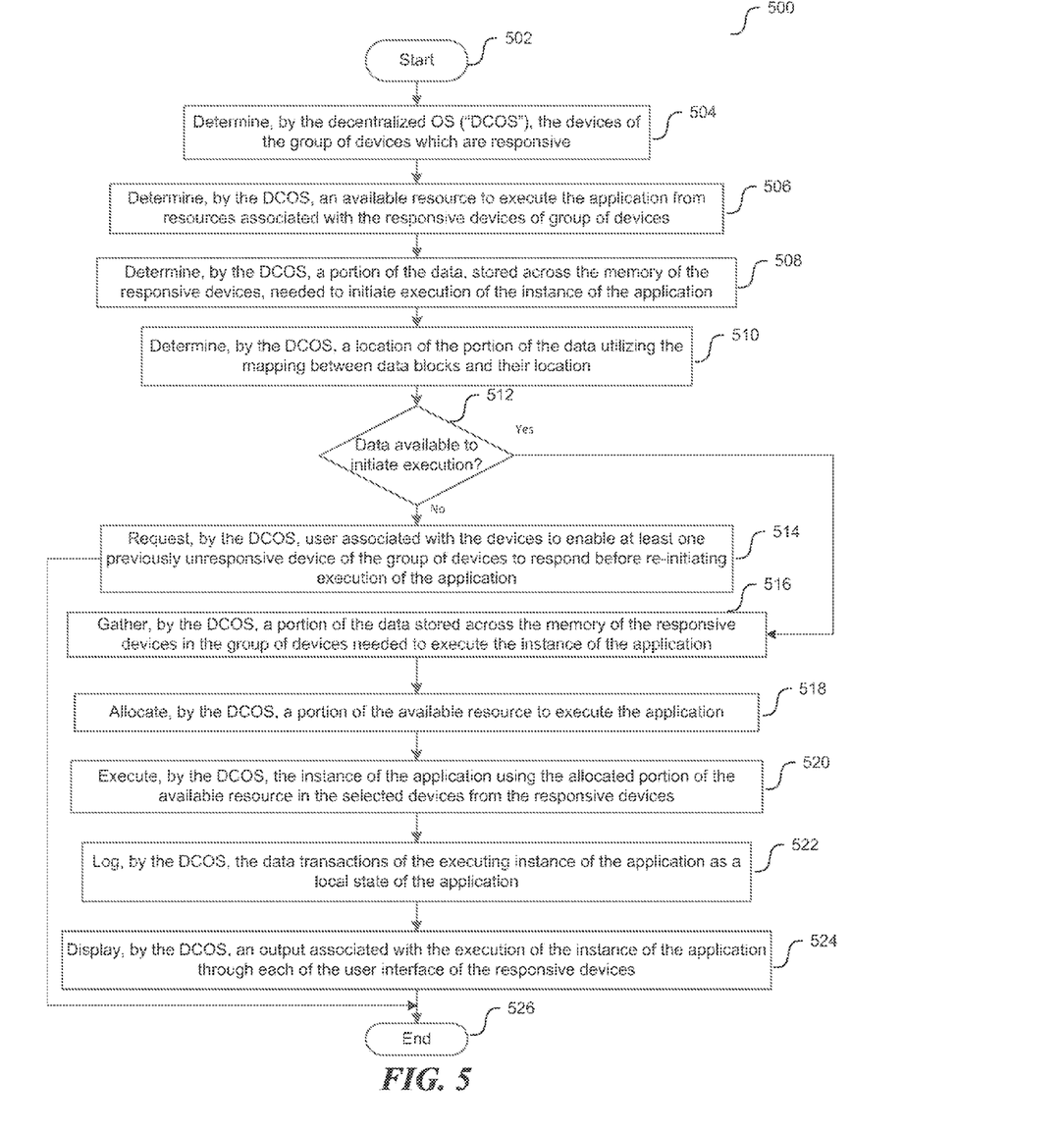
FIG. 5 is a flow diagram illustrating an application execution process implemented by the DCOS to execute the application in an unconnected mode on the DCOS, consistent with various embodiments.

Turning now to FIG. 5, FIG. 5 is a flow diagram illustrating an application execution process 500 implemented by the DCOS 102 to execute the application in an unconnected mode on the DCOS 102, consistent with various embodiments. The process 500 begins at block 502. At block 504, the DCOS 102 determines the devices 112-116 of the group of devices 112-116 which are responsive/accessible. At block 506, the DCOS 102 determines an available resource to execute the application from resources associated with the responsive devices 112-116 of group of devices. At block 508, the DCOS 102 determines a portion of the data, stored across the memory of the responsive devices, needed to initiate execution of the instance of the application.

At block 510, the DCOS 102 determines a location of the portion of the data using the mapping between data blocks and their location. At block 512, the DCOS 102 determines whether all the data needed to initiate execution are available from the responsive/accessible devices. If required data are not available initiate execution, at block 514, the DCOS 102 requests the user associated with the devices 112-116 to enable at least one previously unresponsive device 112-116 of the group of devices 112-116 to respond before re-initiating execution of the application. The process 500 then returns at block 526.

If the required data are available, at block 516, the DCOS 102 gathers a portion of the data stored across the memory of the responsive devices 112-116 in the group of devices 112-116 needed to execute the instance of the application. At block 518, the DCOS 102 allocates a portion of the available resource to execute the application, where the local OS kernel 112a-116a of responsive devices 112-116 whose resources form a part of the allocated resource are notified to allocate the resources to execute the application.

At block 520, the DCOS 102 executes the instance of the application using the allocated portion of the available resource in the selected devices 112-116 from the responsive devices, where the local OS kernel 112a-116a of the selected devices 112-116 perform a function associated with the respective allocated resource. At block 522, the DCOS 102 logs the data transactions of the executing instance of the application as a local state of the application.

At block 524, the DCOS 102 displays an output associated with the execution of the instance of the application through each of the user interface of the responsive devices, where the user associated with the devices 112-116 can access the displayed output through any of the user interfaces of the responsive devices 112-116 at any given time. The process 500 then returns at block 526.

Figure 6:
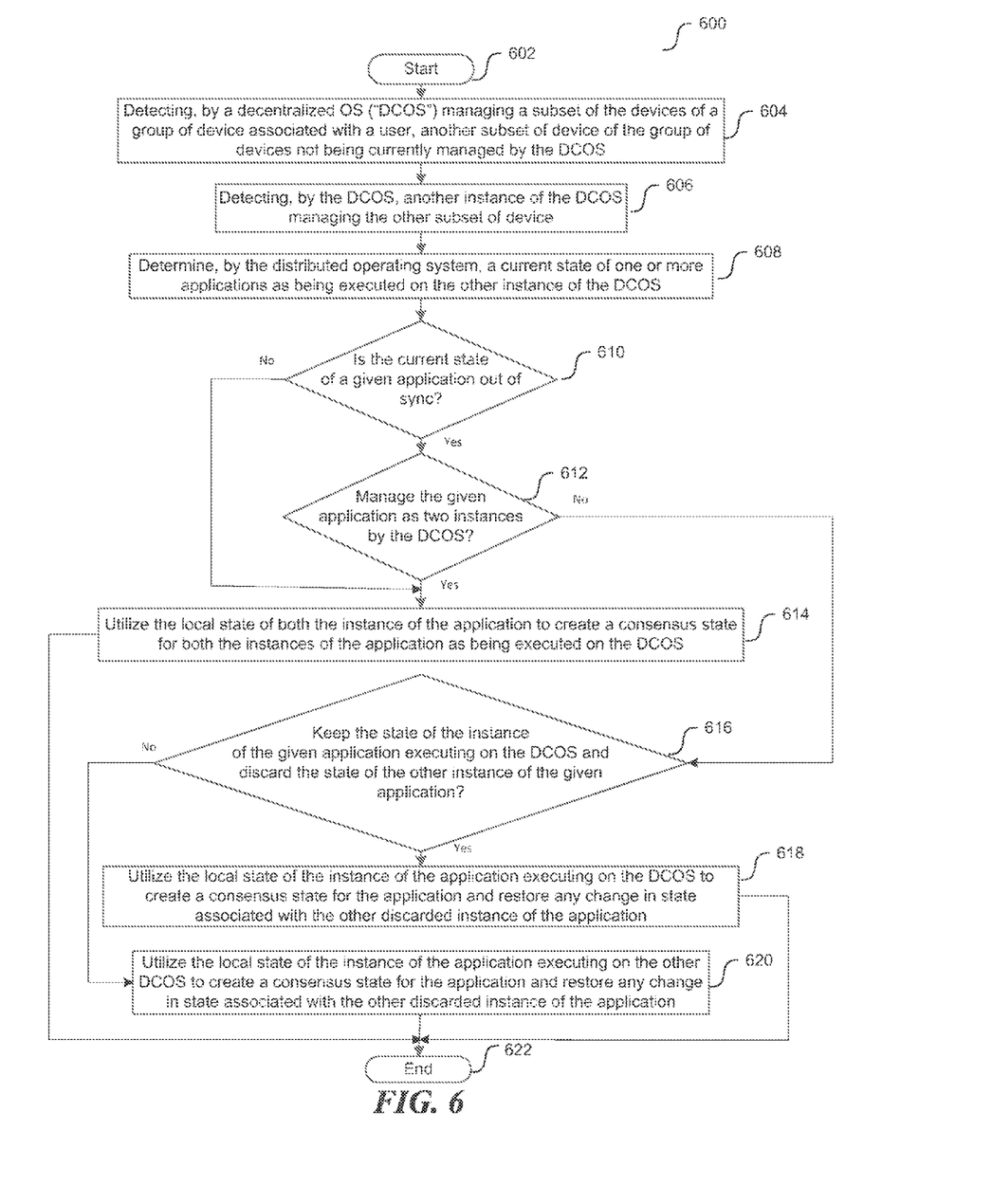
FIG. 6 is a flow diagram illustrating an application state re-syncing process implemented by the DCOS to re-sync application state when a subset of the devices executed in an unconnected mode revert back to connected mode, consistent with various embodiments.

Turning now to FIG. 6, FIG. 6 is a flow diagram illustrating an application state re-syncing process 600 implemented by the DCOS 102 to re-sync application state when a subset of the devices 112-116 executed in an unconnected mode revert back to connected mode, consistent with various embodiments. The process 600 begins at block 602.

At block 604, the DCOS 102, managing a subset of the devices of a group of device associated with a user, detects another subset of device of the group of devices not being currently managed by the DCOS 102. At block 606, the DCOS 102 detects another instance of the DCOS 102 managing the other subset of device. At block 608, the DCOS 102 determines a current state of one or more applications as being executed on the other instance of the DCOS 102.

At block 610, the DCOS 102 determines whether the current state of a given application is out of sync. In one instance, the DCOS 102 queries the local state to determine if the state includes any data modification associated with the given application. If the given applications are determined to be out of sync, at block 612, the DCOS 102 requests the user to choose whether the given application should be maintained as two instances of the given application by the DCOS.

In embodiments, the DCOS 102 informs the given application of the execution being out of sync and allows the given application to utilize one of its built-in out of sync/conflict resolution features to resolve the conflict. The DCOS 102 supports implementation of the conflict resolution feature of the given application. For example, the video game Angry Bird® can include a conflict resolution feature that allows a user to combine the game progress (e.g., levels completed, highest score earned levels, etc.) between the out of sync states to create a single current state that reflects the best combined game progress across the out of sync states. In another instance, the feature may allow the user to maintain the out of sync states of the game as two separate instances of the game.

If the user chooses to maintain two instances of the given application, at block 614, the DCOS 102 uses the local state of both the instance of the application to create a consensus state for both the instances of the application as being executed on the DCOS 102. If the user chooses not to maintain two instances of the given application, at block 616, the DCOS 102 requests the user whether to keep the state of the instance of the given application executing on the DCOS 102 and discard the state of the other instance of the given application not being currently managed by the DCOS 102.

If the user chooses to keep the state on the given application as available on the DCOS 102, at block 618, use the local state of the instance of the application executing on the DCOS to create a consensus state for the application and restore any change in state associated with the other discarded instance of the application. If the user chooses to keep the other state of the given application, at block 620, the DCOS 102 uses the local state of the instance of the application executing on the other DCOS 102 to create a consensus state for the application and restore any change in state associated with the discarded instance of the application. The process 600 then returns at block 622.

Figure 7:
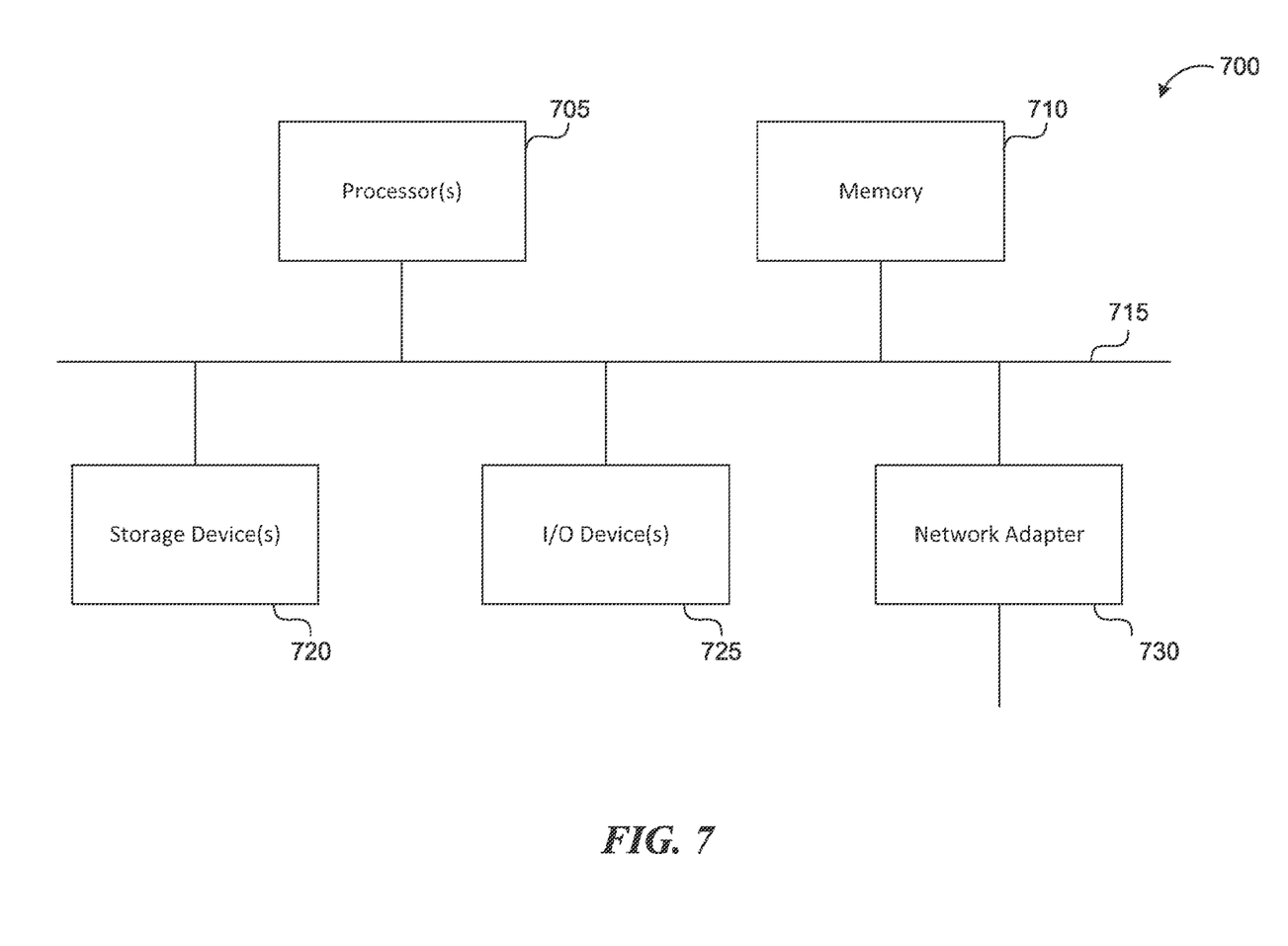
FIG. 7 is a block diagram of a computer system as may be used to implement features of some embodiments of the disclosed technology.

FIG. 7 is a block diagram of a computer system as may be used to implement features of some embodiments of the disclosed technology. The computing system 700 may include one or more central processing units ("processors") 705, memory 710, input/output devices 725 (e.g., keyboard and pointing devices, display devices), storage devices 720 (e.g., disk drives, flash memory, etc.), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, an Institute of Electrical and Electronics Engineers (IEEE) standard 1394 bus, also called "Firewire", or any type of cellular, IP-based or converged telecommunications network, including but not limited to Global System for Mobile Communications (GSM), Worldwide Interoperability for Microwave Access (WiMAX), etc.

The memory 710 and storage devices 720 are computer-readable storage media that may store instructions that implement at least portions of the described technology. In addition, the data structures and message structures may be stored or transmitted via a data transmission medium, such as a signal on a communications link. Various communications links may be used, such as a point-to-point dial-up connection. Thus, computer readable media can include computer-readable storage media (e.g., "non transitory" media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the technology. Accordingly, the technology is not limited except as defined by the appended claims.

What is claimed is:

1. A method for managing multiple computing devices to interoperate to execute an instruction, the method comprising:
    receiving, by a first instance of a decentralized operating system ("DCOS"), the instruction to be executed, wherein the first instance of the DCOS is executing using resources associated with the multiple computing devices, each of the multiple computing devices comprising a portion of the DCOS and an associated local operating system ("OS") kernel that manages a given resource associated with the computing device;
    determining, by the first instance of the DCOS, an available resource to execute the instruction from the resources associated with the multiple computing devices;
    allocating, by the first instance of the DCOS, a portion of the available resources to execute the instruction, the allocation comprising a notification to one or more of the multiple computing devices having associated resources that form a part of the allocated portion of the available resource to execute the instruction;
    gathering, by the first instance of the DCOS, a data block required to initiate execution of the instruction, wherein the data block is stored in a memory of a particular computing device of the multiple computing devices;
    executing, by the first instance of the DCOS, the instruction using the gathered data block and the allocated portion of the available resource in the one or more of the multiple computing devices;
    querying the local OS kernel of each computing device of the multiple computing devices, to determine a first local state of one or more applications executed on the first instance of the DCOS;
    detecting a set of computing devices managed by a second instance of the DCOS, wherein a second local state of the one or more applications is logged by the second instance of the DCOS;
    determining that the first local state and the second local state are out of sync; and
    synchronizing the first local state with the second local state to obtain a consensus state of the one or more applications.

2. The method of claim 1, further comprising:
    displaying, by the first instance of the DCOS, an output associated with the execution of the instruction through a plurality of user interfaces associated with the multiple computing devices, the displayed output being accessed through any of the plurality of user interfaces at a given time.

3. The method of claim 1, wherein gathering the data block required to initiate execution of the instruction further comprises:
    identifying, by the first instance of the DCOS, a location of the data block, wherein the identified location comprises a reference to the particular computing device storing the data block;
    determining, by the first instance of the DCOS, a response state of the particular computing device;
    prompting a user to activate the particular computing device when the response state of the particular computing device is determined to be non-responsive; and
    gathering, by the first instance of the DCOS, the data block by using the identified location to query the particular computing device for the data block.

4. The method of claim 1, wherein each of the one or more of the multiple computing devices performs a function associated with their respective resource that forms the part of the allocated portion of the available resource to execute the instruction.

5. The method of claim 1, wherein the notification comprises a request to the local OS kernel of each of the one or more of the multiple computing devices to allocate associated resources that form the part of the allocated portion of the available resource to execute the instruction.

6. The method of claim 1, further comprises:
    using the resources associated with the multiple computing devices to install the first instance of the DCOS across the multiple computing devices.

7. The method of claim 1, further comprises:
    generating the instruction to be executed with an instance of an application running on the first instance of the DCOS.

8. The method of claim 1, wherein each of the multiple computing devices comprises any of a smartphone, a tablet, and a laptop; and
    wherein the local OS kernel associated with each of the multiple computing devices comprises any of a microkernel, a monolithic kernel, and a nanokernel.

9. A method for managing multiple computing devices for interoperably executing an application, the method comprising:
    determining, by a first instance of a decentralized operating system ("DCOS"), an available resource to execute the application from resources associated with the multiple computing devices, wherein the first instance of the DCOS is executed using the resources associated with the multiple computing devices, each of the multiple computing devices comprising a portion of the DCOS and an associated local operating system ("OS") kernel that manages a given resource associated with the computing device;
    allocating, by the first instance of the DCOS, a portion of the available resource to execute the application, the allocation comprising a notification to one or more of the multiple computing devices whose associated resources form a part of the allocated portion of the available resource that is used to execute the application;
    gathering, by the first instance of the DCOS, a data block required to initiate execution of a first instance of the application, wherein the data block is stored in a memory of a particular computing device of the multiple computing devices; and
    executing, by the first instance of the DCOS, the first instance of the application using the allocated portion of the available resource in the one or more of the multiple computing devices;
    displaying, by the first instance of the DCOS, an output associated with the execution of the first instance of the application through a plurality of user interfaces associated with the multiple computing devices, wherein the displayed output is accessed through any of the plurality of user interfaces at a given time;

querying the local OS kernel of each computing device of the multiple computing devices, to determine a first local state of the first instance of the application executed on the first instance of the DCOS;

detecting a set of computing devices managed by a second instance of the DCOS, wherein a second local state of a second instance of the application is logged by the second instance of the DCOS;

determining that the first local state and the second local state are out of sync; and synchronizing the first local state with the second local state to obtain a consensus state of the application.

10. The method of claim 9, wherein each of the one or more of the multiple computing devices performs a function associated with their respective resource that forms the part of the allocated portion of the available resource to execute the first instance of the application.

11. The method of claim 9, wherein gathering the data block required to initiate execution of the first instance of the application comprises:

identifying, by the first instance of the DCOS, a location of the data block, wherein the identified location comprises a reference to the particular computing device storing the data block;

determining, by the first instance of the DCOS, a response state of the particular computing device;

prompting a user to activate the particular computing device when the response state of the particular computing device is determined to be non-responsive; and gathering, by the first instance of the DCOS, the data block by using the identified location to query the particular computing device for the data block.

12. The method of claim 9, wherein the notification comprises a request to the local OS kernel of each of the one or more of the multiple computing devices to allocate associated resources that form the part of the allocated portion of the available resource to execute the first instance of the application.

13. The method of claim 9, further comprises:
using the resources associated with the multiple computing devices to install the first instance of the DCOS across the multiple computing devices.

14. The method of claim 9, further comprises:
generating an instruction to be executed with the first instance of the application running on the first instance of the DCOS.

15. The method of claim 9, wherein each of the multiple computing devices comprises any of a smartphone, a tablet, and a laptop; and wherein the local OS kernel associated with each of the multiple computing devices comprises any of a microkernel, a monolithic kernel, and a nanokernel.

16. A non-transitory computer readable storage medium storing computer executable instructions, comprising:

instructions for determining an available resource to execute a first instance of an application from resources associated with multiple computing devices being managed by a first instance of decentralized operating system ("DCOS"), wherein the first instance of the DCOS is executed using resources associated with the multiple computing devices, each of the multiple computing devices comprising a portion of the DCOS and an associated local operating system ("OS") kernel that manages a given resource associated with the computing device;

instructions for allocating a portion of the available resources to execute the first instance of the application, the allocation comprising a notification to one or more of the multiple computing devices having associated resources that form a part of the allocated portion of the available resource to execute the first instance of the application;

instructions for gathering a data block required to initiate execution of the first instance of the application, wherein the data block is stored in a memory of a particular computing device of the multiple computing devices; and instructions for executing the first instance of the application using the allocated portion of the available resource in the one or more of the multiple computing devices; and instructions for displaying an output associated with the execution of the first instance of the application through a plurality of user interfaces associated with the multiple computing devices, wherein the displayed output is accessed through any of the plurality of user interfaces at a given time;

instructions for querying the local OS kernel of each computing device of the multiple computing devices, to determine a first local state of the first instance of the application executed on the first instance of the DCOS;

instructions for detecting a set of computing devices managed by a second instance of the DCOS, wherein a second local state of a second instance of the application is logged by the second instance of the DCOS;

instructions for determining that the first local state and the second local state are out of sync; and instructions for synchronizing the first local state with the second local state to obtain a consensus state of the application.

17. The non-transitory computer readable storage medium of claim 16, wherein each of the one or more of the multiple computing devices performs a function associated with their respective resource that forms the part of the allocated portion of the available resource to execute the first instance of the application.

18. The non-transitory computer readable storage medium of claim 16, wherein the instructions for gathering the data block required to initiate execution of the first instance of the application comprises:

instructions for identifying a location of the data block, wherein the identified location comprises a reference to the particular computing device storing the data block;

instructions for determining a response state of the particular computing device;

instructions for prompting a user to activate the particular computing device when the response state of the particular computing device is determined to be non-responsive; and instructions for gathering the data block by using the identified location to query the particular computing device for the data block.

19. The non-transitory computer readable storage medium of claim 16, wherein the notification comprises a request to the local OS kernel of each of the one or more of the multiple computing devices to allocate associated resources that form the part of the allocated portion of the available resource to execute the first instance of the application.

20. The non-transitory computer readable storage medium of claim 16, further comprises:
   using the resources associated with the multiple computing devices to install the first instance of the DCOS across the multiple computing devices.

21. The non-transitory computer readable storage medium of claim 16, further comprises:
   generating an instruction to be executed with the first instance of the application running on the first instance of the DCOS.

22. The non-transitory computer readable storage medium of claim 16, wherein each of the multiple computing devices comprises any of a smartphone, a tablet, and a laptop; and
   wherein the local OS kernel associated with each of the multiple computing devices comprises any of a microkernel, a monolithic kernel, and a nanokernel.

* * * * *